(12) United States Patent
Casper et al.

(10) Patent No.: US 7,155,006 B2
(45) Date of Patent: Dec. 26, 2006

(54) METHOD AND APPARATUS FOR OUTBOUND WAVE SUBTRACTION USING A VARIABLE OFFSET AMPLIFIER

(75) Inventors: Bryan K. Casper, Hillsboro, OR (US); Stephen R. Mooney, Beaverton, OR (US); Aaron K. Martin, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 636 days.

(21) Appl. No.: 09/960,821

(22) Filed: Sep. 21, 2001

(65) Prior Publication Data

US 2003/0059036 A1    Mar. 27, 2003

(51) Int. Cl.
*H04M 1/00* (2006.01)
*H04M 9/00* (2006.01)

(52) U.S. Cl. .................................. 379/390.4
(58) Field of Classification Search ................ 370/252, 370/376, 282, 286, 287, 289, 292; 379/402, 379/391–392, 406.01–406.16, 345, 390.94; 375/146.2, 316

See application file for complete search history.

(56) References Cited

U.S. PATENT DOCUMENTS

| | | | |
|---|---|---|---|
| 4,128,743 A | * | 12/1978 | Huellwegen ............. 340/425.1 |
| 4,754,169 A | | 6/1988 | Morris |
| 4,987,327 A | | 1/1991 | Fernandez et al. |
| 5,204,854 A | * | 4/1993 | Gregorian et al. .......... 370/288 |
| 5,563,598 A | | 10/1996 | Hickling |
| 6,348,882 B1 | | 2/2002 | Ciccone et al. |
| 6,388,521 B1 | | 5/2002 | Henry |

* cited by examiner

*Primary Examiner*—Curtis Kuntz
*Assistant Examiner*—Alexander Jamal
(74) *Attorney, Agent, or Firm*—Blakely, Sokoloff, Taylor & Zafman LLP (57) ABSTRACT

A method and apparatus for outbound wave subtraction using a variable offset amplifier is described. The method includes calibration of a bi-directional signaling circuit in order to calculate one or more offset codes for cancellation of an outbound wave within a bi-directional communications link. Once the one or more offset codes are calculated, it is determined whether a dual inbound wave is received by the bi-directional signaling circuit. Once received, an offset code from the one or more calculated offset codes is selected according to a value of an outbound wave within the dual inbound/outbound wave. Finally, the outbound wave is cancelled from the dual inbound wave at an output of a variable offset amplifier using the selected offset code.

19 Claims, 11 Drawing Sheets

VARIABLE OFFSET COMPARATOR 300

OUTBOUND WAVE SUBTRACTION FILTER 460

METHOD AND APPARATUS FOR OUTBOUND WAVE SUBTRACTION USING A VARIABLE OFFSET AMPLIFIER

FIELD OF THE INVENTION

The present invention relates generally to a simultaneous bi-directional communications link. In particular, the present invention relates to an apparatus and method for outbound wave subtraction using a variable amplifier.

BACKGROUND OF THE INVENTION

Simultaneous bi-directional signaling describes a signaling technique that transmits bits simultaneously, in both directions, over a single transmission line. Bi-directional signaling makes uses of the capability of wires to transmit waves in both directions. In contrast, transmitting data in only a single direction avoids full use of the bandwidth available over a single transmission line. As such, in simultaneous bi-directional signaling circuits, bits travel in one direction on a forward-traveling wave and in the other direction, on a reverse traveling wave.

Accordingly, transmitted waves within a bi-directional signal circuit are transmitted in both directions, at the same time, resulting in the formation of a wave on the transmission line, which is a superposition of the forward and reverse traveling waves. As a result, the effective wire density and pin count of a system can be doubled by sending bits simultaneously in both directions over a transmission line using simultaneous bi-directional signaling. As an example, a simultaneous bi-directional signaling circuit 100 is depicted in FIG. 1.

Figure 1:
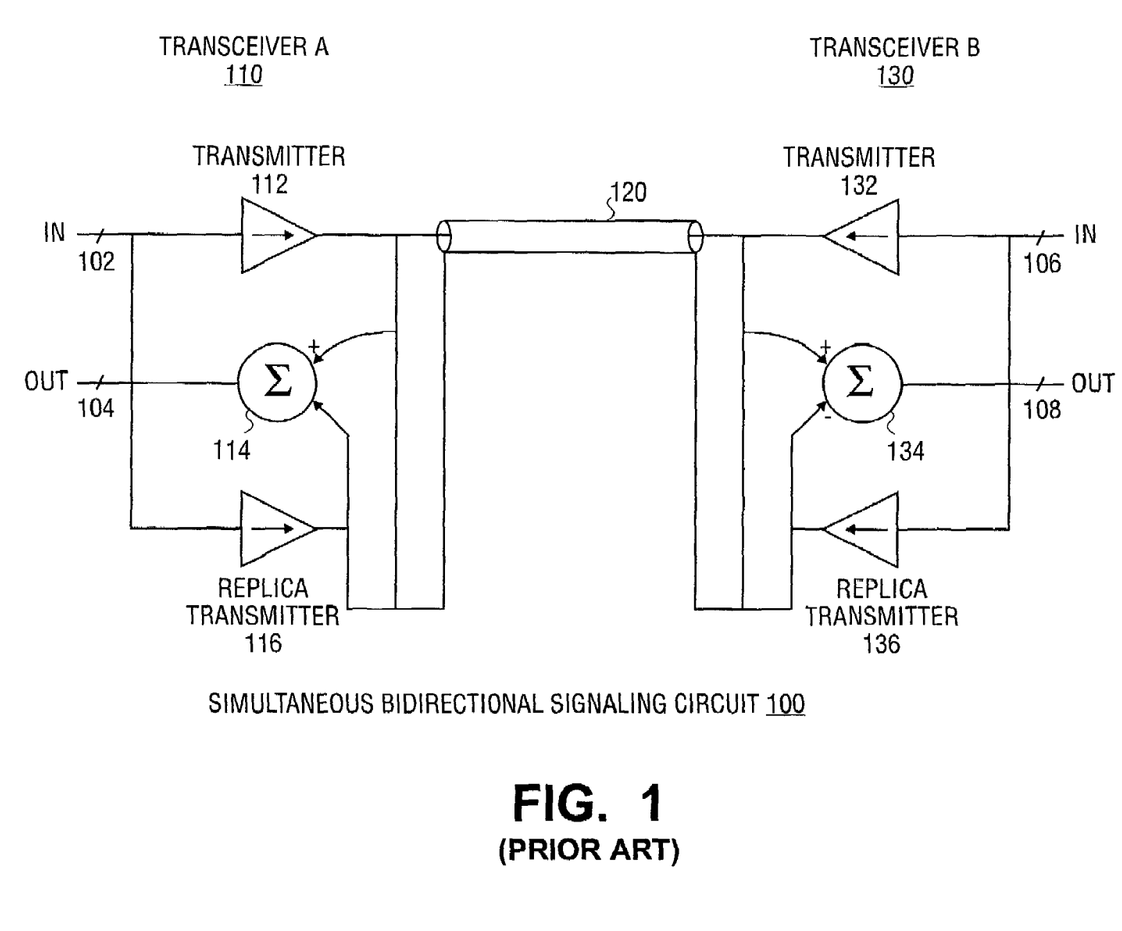
FIG. 1 depicts a block diagram illustrating a simultaneous bi-directional signaling circuit as known in the art.

As depicted in FIG. 1, bits within the bi-directional signaling circuit 100 travel to the right from transceiver A 110 to transceiver B 130 and are encoded on a forward traveling wave. Conversely, bits traveling to the left from transceiver B 130 to transceiver A 110 are encoded on the reverse traveling wave. Accordingly, the voltage on the transmission line 120 is a superposition of the forward and reverse traveling waves. Consequently, in order to reconstruct or recover a received signal, for example at transceiver A 110, the receiver 116 constructs a copy of the forward traveling wave and subtracts this wave from the transmission line voltage in order to recover the received data.

As a result, a conventional bi-directional signaling circuit 100 utilizes a subtraction circuit 114/134 in order to recover received data. Unfortunately, the requirement of a subtraction circuit within bi-directional signaling circuits, such as depicted in FIG. 1, result in low power and inefficient area usage. In addition, such techniques are not always compatible with advance communication techniques, such as channel filtering and multi-level signaling. In addition, the use of subtraction circuits and replica drivers will lead to lower bandwidths of input/output (I/O) links in future products.

In other words, the limitations describe above are due to the fact that conventional simultaneous bi-directional signaling circuits utilize analog means, such as subtractors and replica drivers, in order to recover a received inbound wave from the superposition of the forward and reverse traveling waves. Therefore, there remains a need to overcome one or more of the limitations in the above-described, existing art.

BRIEF DESCRIPTION OF THE DRAWINGS

The features, aspects, and advantages of the present invention will become more fully apparent from the following Detailed Description and appended claims when taken in conjunction with accompanying drawings in which:

DETAILED DESCRIPTION

A method and apparatus for outbound wave subtraction using a variable offset amplifier are described. The method includes calibration of a bi-directional signaling circuit in order to calculate one or more offset codes for cancellation of an outbound wave within a bi-directional communications link. Once the one or more offset codes are calculated, it is determined whether a dual inbound wave is received by the bi-directional signaling circuit. Once received, an offset code from the one or more calculated offset codes is selected according to a value of an outbound wave within the dual inbound/outbound wave. Finally, the outbound wave is cancelled from the dual inbound wave at an output of a variable offset amplifier using the selected offset code.

An apparatus for a simultaneous bi-directional signaling circuit is also described, which includes a variable offset amplifier or comparator, which is coupled to a bi-directional communications link. An outbound driver is coupled to the variable offset amplifier via the bi-directional communications link, while an inbound driver is also coupled to the variable offset amplifier via the bi-directional communications link. Finally, an offset calibration ration control is coupled between an output of the variable offset amplifier and an input of the outbound driver in order to calculate the one or more offset values to cancel an outbound wave from a received dual inbound/outbound wave at an output of the variable offset amplifier.

In the following description, for the purposes of explanation, numerous specific details are set forth in order to provide a thorough understanding of the present invention. It will be apparent, however, to one skilled in the art that the present invention may be practiced without some of these specific details. For example, various signals, layout patterns, memory cell configurations and circuits, and logic circuits may be modified according to the teachings of the present invention.

In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

In an embodiment, the methods of the present invention are embodied in machine executable instructions. The instructions can be used to cause a general purpose or special purpose processor that is programmed with the instructions to perform the methods of the present invention. Alternatively, the methods of the present invention might be performed by specific hardware components that contain hard wired logic for performing the steps or any combination of the programmed computer components and custom hardware components.

The present invention may be provided as a computer program product which may include a machine or computer readable medium having stored thereon instructions which may be used to program a computer or other electronic devices to perform a process according to the present invention. Accordingly, the computer readable medium includes any type of media/machine/computer-readable medium suitable for storing electronic instructions.

System Architecture

Figure 2:
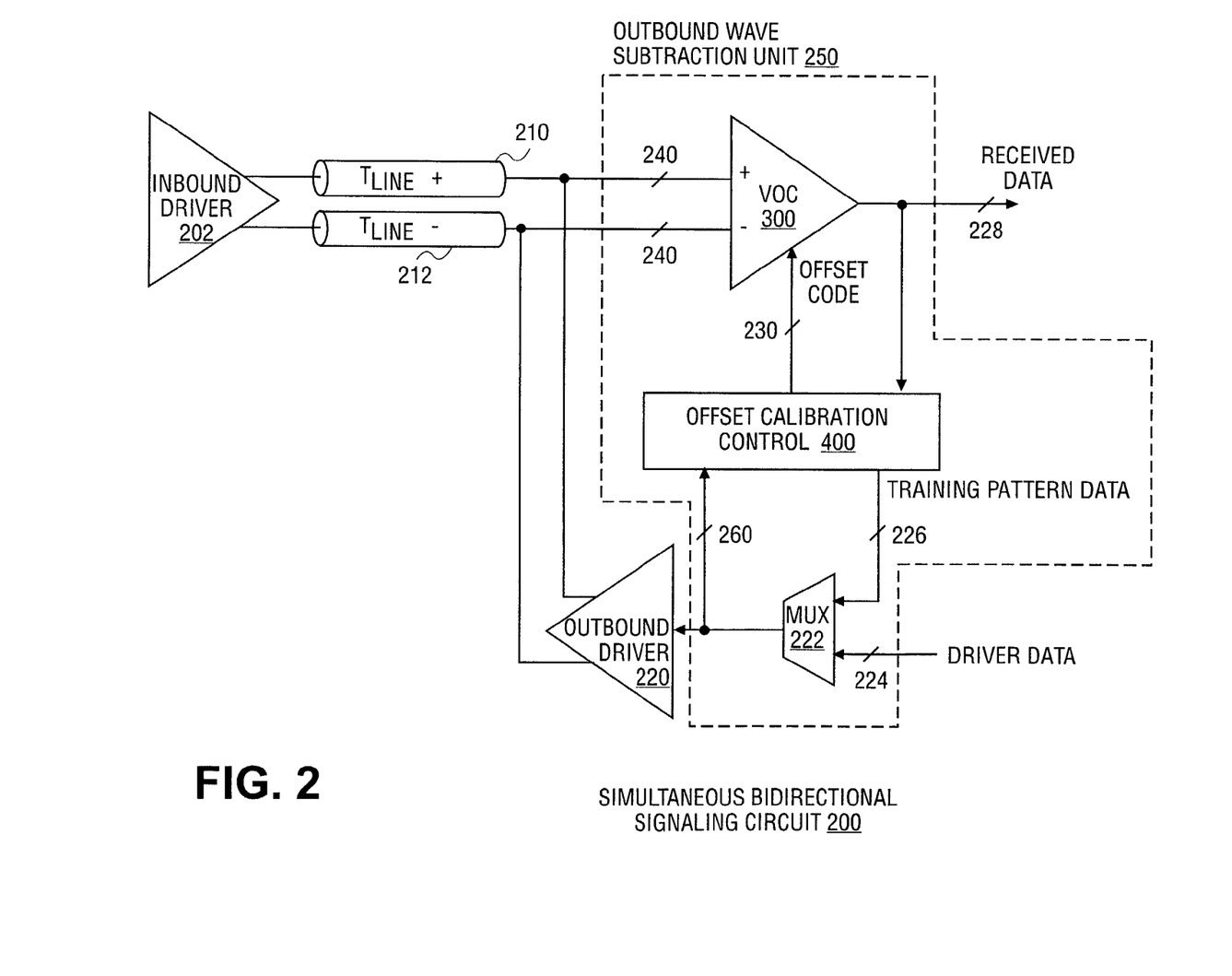
FIG. 2 depicts a block diagram illustrating a simultaneous bi-directional signaling circuit in accordance with one embodiment of the present invention.

Referring now to FIG. 2, FIG. 2 depicts a block diagram illustrating a simultaneous bi-directional signaling circuit 200 in accordance with one embodiment of the present invention. The bi-directional signaling circuit 200 includes an outbound wave subtraction unit 250 that makes use of a variable offset amplifier or a variable offset comparator 300 (these words used interchangeably as described herein) in order to cancel an outbound wave from a dual inbound outbound wave 240 received by the simultaneous bi-directional signaling circuit 200. Accordingly, cancellation of the outbound wave enables receiving of received inbound data.

As depicted in FIG. 2, the subtraction unit 250 of bi-directional signaling circuit 200 includes the variable offset comparator 300, which is coupled to a bi-directional communications link 210/212 in the embodiment described whose input is coupled to receive a transmission line analog signal level. However, in alternate embodiments, the transmission lines may include a single transmission line. The bi-directional signaling circuit 200 further includes an inbound driver 202 coupled to the variable offset amplifier 300 via the bi-directional communications link 210/212. An outbound driver 220 is also coupled to the variable offset amplifier (VOA/VOC) 300 via the bi-directional communications link 210/212.

In the embodiment shown, the VOC input and the analog signal are differential rather than single ended, to reduce common mode noise. Alternatively, a single ended comparator input coupled to receive a single ended transmission line signal may be used if the application can tolerate the higher common mode noise levels typically associated with single ended operation.

The signal level is compared to a reference level of the VOC 300. According to an embodiment of the equalization loop, the VOC 300 has a substantially variable offset that is controllable to represent the variable reference level. In other words, varying the reference is performed by changing the offset of the VOC 300.

In order to perform calibration of the VOC 300 in order to enable cancellation of an outbound wave, the bi-directional signaling circuit 200 includes an offset calibration control 400. The offset calibration control 400, during a calibration mode, transmits training pattern data 226, which is driven to the variable offset comparator via the outbound driver 220. Accordingly, the training pattern data is utilized by the offset calibration control 400 to determine one or more offset codes 230, which are fed to the VOC 300 in order to cancel an outbound wave from a dual inbound/outbound wave 240. Once the outbound wave is cancelled, the inbound wave (received data 228) is provided as receiver data to an attached receiver (not shown).

In one embodiment, calibration mode of the simultaneous bi-directional signaling circuit 200 is performed by disabling the inbound driver 202 and driving the outbound driver 220 with a selected signaling level of the bi-directional communications link 210. Accordingly, in one embodiment the training pattern data is simply a selection of each signaling level of the bi-directional communications link 210. As such, a selected signaling level is driven by the outbound driver 220 to an input of the VOC 300. Once driven, the offset code 230, which is provided to the VOC 300 by the offset calibration control 400, is swept until a state change of the VOC output is detected. In other words, once a state change in the VOC output is detected, the selected signaling level has been canceled.

As such, a final level of the swept offset code is saved by the offset calibration control. The final swept offset code forms an offset code of the one or more offset codes calculated by the offset calibration control to cancel each signaling level within the bi-directional communications link 210/212. Consequently, when a dual inbound wave is received, including inbound data driven by the inbound driver 202 and outbound data driven by the outbound driver 220, which combines to form the dual inbound/outbound data 240, the offset calibration control determines a value of the driver data 224 and based on that value, selects an offset code. Once selected the offset code is provided to the VOC 300 in order to cancel the outbound wave from the dual inbound/outbound wave data 240.

Figure 3:
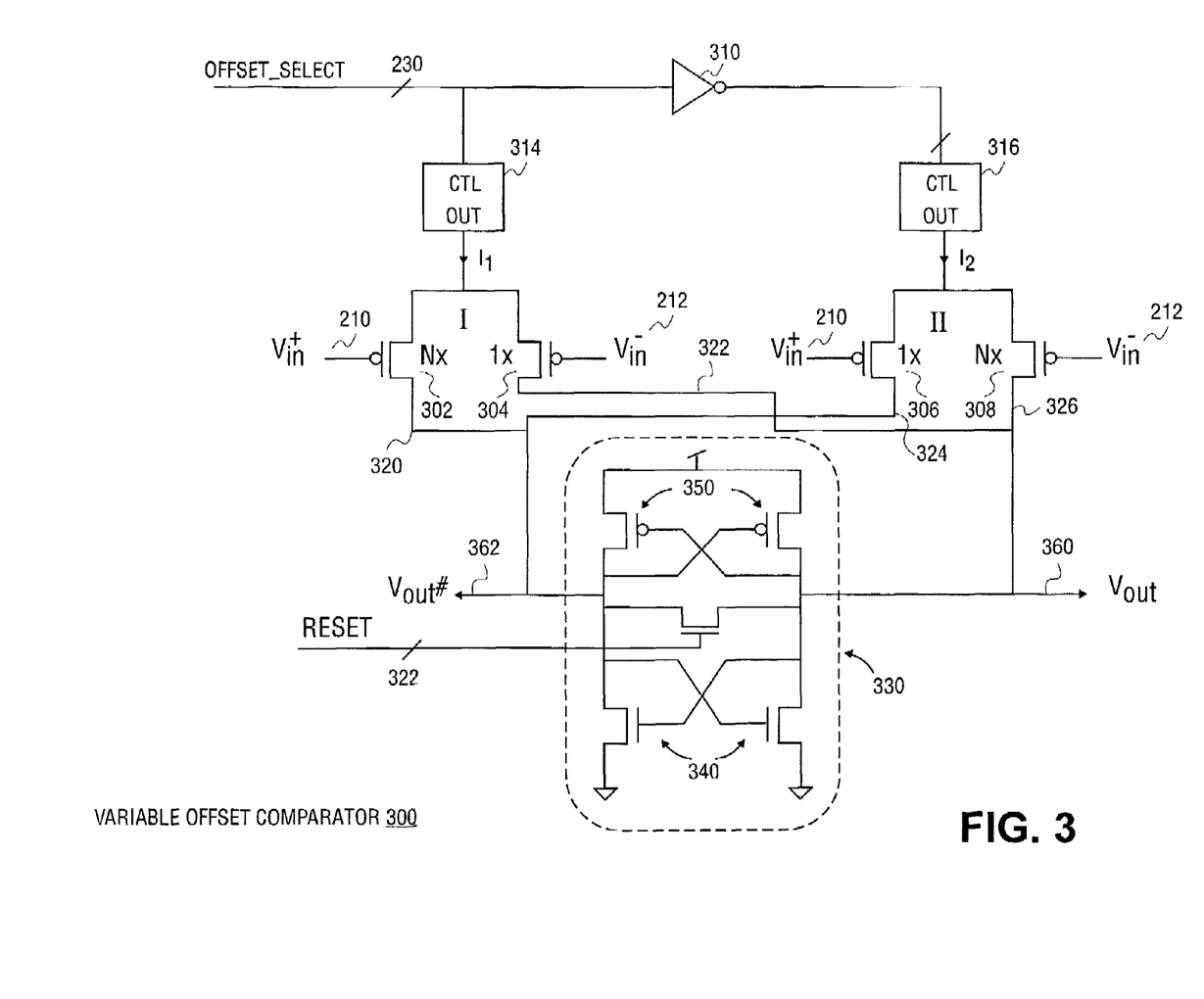
FIG. 3 depicts a block diagram illustrating a variable offset comparator in accordance with a further embodiment of the present invention.

Referring now to FIG. 3, FIG. 3 depicts a circuit diagram which illustrates a circuit schematic of a digitally controllable variable offset comparator 300, for example as depicted in FIG. 2, in accordance with an exemplary embodiment of the present invention. The VOC 300 includes an amplifier circuit which may be implemented using P-channel metal oxide semiconductor field effect transistors (MOSFETs), N-channel MOSFETs or the like.

Accordingly, the embodiment described includes a first differential transistor pair 302, 304 and a second differential transistor pair 306 and 308. Each pair is intentionally unbalanced. For instance, in this embodiment, the unbalanced characteristic is obtained by the transistor 302 being larger than the transistor 304 by a factor N>1 than the width of the transistor channel. Also, transistor 308 has a greater channel width than transistor 306 by, in this embodiment, the same factor N. To help in keeping manufacturing costs low, the length of the transistor channels may be the same across all transistors and the amplifier.

The first and second transistor pairs may be referred to as being intercoupled to each other because the output node 320 of the first pair 302/304 is coupled to output node 324 of the second pair 306/308, while output node 322 of the first pair 302/304 is coupled to output node 326 of the second pair 306/308. The respective tailcurrents of the differential pairs (I1 and I2) are controlled by digitally controllable current sources 314 and 316. These current generators 314 and 316 are controlled by a digital value (offset code 230). As such, in this embodiment each digital value of the offset code corresponds to varying tailcurrents I1 and I2 that are equidistant from a nominal tailcurrent. Accordingly, in the embodiment described, increasing I1 and decreasing I2 results in a decrease and a difference output voltage ($V_{out}$-$V_{out\#}$) as given by the expression:

$$V_{out}-V_{out\#}=-[2(n-1)/(n+1)]*\Delta I*R_{load} \quad (1)$$

As such, the gain of the amplified circuit is determined by a variety of factors including the impedance $R_{load}$ and the transconductance of each transistor and the first and second differential pairs. This decrease provided by equation (1) is the offset force provided by the change in the tailcurrents. Now if the tailcurrents are changed in the reverse direction, that is if I1 is decreased and I2 is increased by the same amount, the difference voltage is given by the following expression:

$$V_{out}-V_{out\#}=[2(n-1)/(n+1)]*\Delta I*R_{load} \quad (2)$$

which is an offset in the output voltage that is opposite in polarity to that given by equation (1). Thus this example illustrates how opposite polarity offsets may be obtained in proportion to a differential change in the tailcurrents.

As will be recognized by those skilled in the art, although in the example above the change in tailcurrents was exactly differential and that one tailcurrent was increased by exactly the same amount as the other tailcurrent was decreased. However, amplifier circuit may still be useful if the currents are changed in unbalanced ways. Also unequal load impedances may alternatively be provided to force a non-zero nominal offset. A single-ended output for the comparator may be available as either $V_{out}$ or $V_{out\#}$. To drive these output signals into one of two possible stable states a regenerative load circuit 330 is provided as shown.

The regenerative load circuit 330, after being reset by an input signal, will quickly amplify any difference between $V_{out}$ and $V_{out\#}$ where such amplification occurs at a relatively high gain due to the cross-coupled N-channel pair 340 and P-channel pair 350. As a result, the regenerative load circuit 330 ensures that the output signals $V_{out}$ and $V_{out\#}$ assume one of two possible stable states. Thus, if $V_{in}$+ is greater than $V_{in}$− by at least the amount of offset that has been selected (as referred back to the input of the differential pairs) then the regenerative latch circuit 330 forcefully drives $V_{out}$ to a low voltage level and simultaneously drives $V_{out\#}$ to a high voltage level. Other types of regenerative latch circuits may be used to provide the digital type output signal typically associated with a sense amplifier or a comparator application.

In order to determine a zero offset code for the variable offset comparator 300 an offset trimming process is performed as follows: first, the comparator inputs are shorted to each other and if necessary to some reasonable value. The offset adjustment is then swept from the maximum negative to the positive offset value. Assuming the gain of the comparator is very large, the output of the comparator will change from low to high when the offset adjustment value is at the lowest setting. At this setting the offset of the comparator may be less than one least significant bit (LSB) of offset resolution. Note that changing the offset of the comparator may be viewed as changing the reference level to which a differential input signal $V_{in}$+−$V_{in}$−, as connected in the embodiment of FIG. 6 will be compared by the comparator.

Thus the reference level of the comparator may be set by the offset adjustment. In other words, a variable offset comparator, as depicted in FIG. 3, allows a variable non-zero offset to be introduced by varying the respective tailcurrents of the differential pairs. This variable offset capability allows the inherent offset of the amplifier to be cancelled so that zero offset is achieved. In addition, non-zero offset may be beneficial in certain applications such as adders and subtractors. Rather than requiring a separate adder circuit or subtractor circuit, the amplifier 300 can be used to inherently add a value to an input signal or subtract a value to that input signal by setting a non-zero offset to include or remove the value.

In addition, the amplifier 300 also permits the polarity of the offset to be changed as a function of changing tailcurrents. This means that there may be a positive or negative offset that is permissible about a center or nominal offset value. Yet another advantage of the amplifier circuit is that relatively large offset changes may be introduced using relatively small changes in the tailcurrent. Accordingly, once an offset code is determined, the VOC 300 may be utilized to cancel an outbound wave from a dual inbound/outbound wave.

Figure 4:
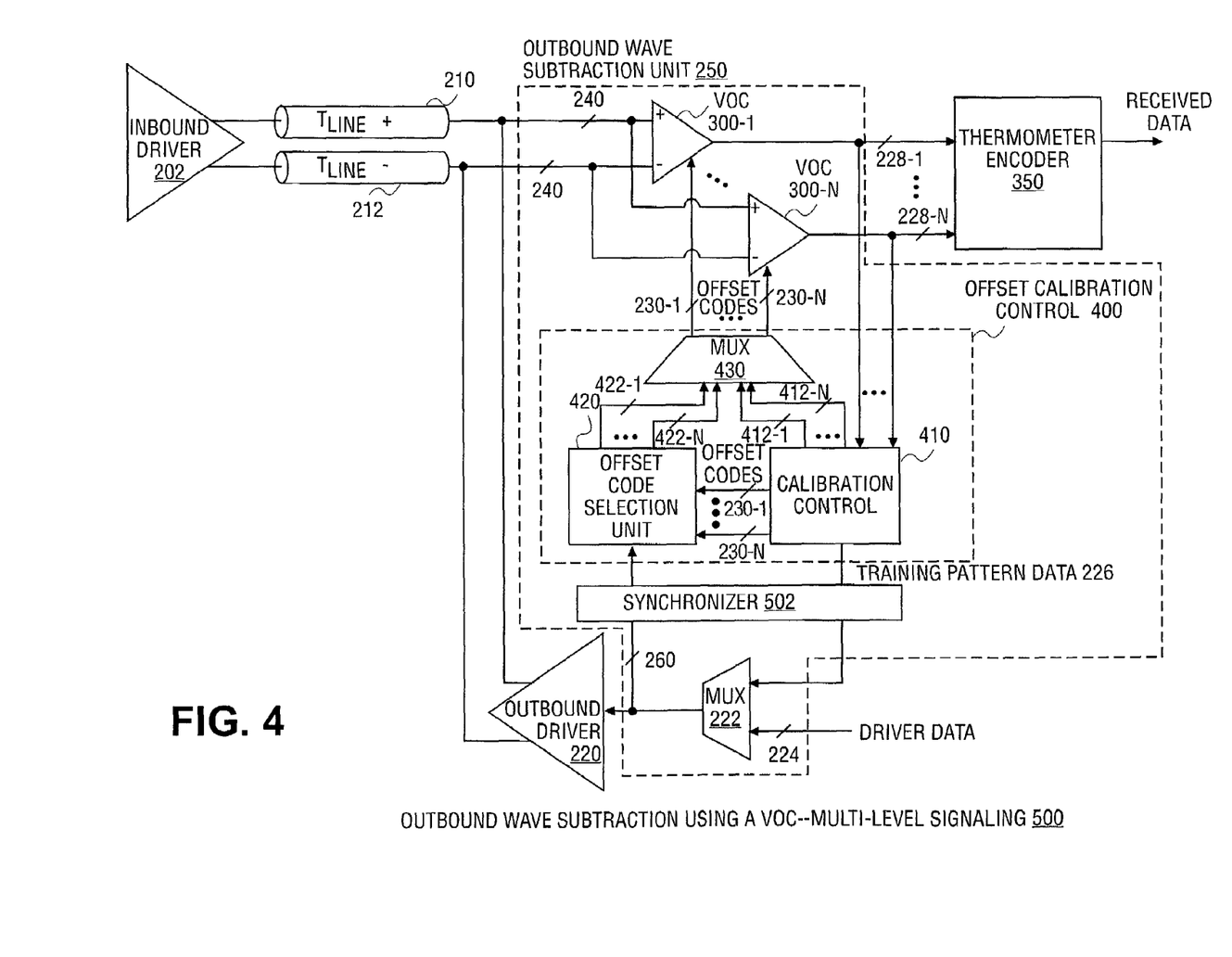
FIG. 4 depicts a block diagram illustrating a simultaneous bi-directional circuit utilizing multilevel signaling in accordance with a further embodiment of the present invention.

Referring now to FIG. 4, FIG. 4 further illustrates a simultaneous bi-directional signaling circuit 500 which includes the capability to subtract an outbound wave wherein a communications link of the circuit 500 or supports multilevel signaling. As such, the bi-directional signaling circuit 500 includes the components as described with reference to FIG. 2. However, a plurality of VOC 300 (300-1, . . . , 300-N) are depicted in order to cancel the outbound wave for each signaling level. In addition, the offset calibration control 400 is further illustrated.

The offset calibration control 400 includes calibration control 410 which is coupled to each of the VOC 300 output. The calibration control 400 further includes an offset code selection unit 420 as well as an input selection unit 430 for providing a respective offset code 230 to the VOCs 300. In one embodiment, assuming four-level pulse amplitude modulation (PAM) signaling, three VOCs 300 would be required to perform outbound wave subtraction.

Accordingly, the calibration control 410 will transmit a training pattern 226, which as described above includes a selected signaling level of the multi-level signaling of the bi-directional communications link 210/212. As such, each signaling level will be driven to the VOC 300 until the VOC offset code is swept to a detected offset code which subtracts the selected signaling level from the VOC output. Once determined, the offset code is saved and the process is repeated for each signaling level of the bi-directional communications link 210/212. As a result, when a dual inbound/outbound wave 240 is received at each of the VOC 300 inputs, the offset code selection unit 420 will select a respective offset code 230 (230-1, . . . , 230-N) based on a value 260 of driver data 224.

Consequently, in one embodiment, the offset code selection unit 420 is a multiplexer which includes inputs of the offset codes 230 from the calibration control 410 and selects an offset code 422 based on the driver data input 260. As such, this offset code 422 is provided to the MUX 430 which provides the offset code 230 to the VOC 300. This process is performed in parallel for each of the VOCs 300. However, during calibration mode the MUX 430 supplies the swept offset codes 412 by the calibration control 410. In addition, the signaling circuit 500 further includes a synchronizer 502 to synchronize the training pattern data 226 as well as the driver data 224 in order to select offset codes 422 by the offset code selection unit 420.

| Symbol # | Analog Signal Level (Voltage) | VOC (Outputs) | Encoded Output |
|---|---|---|---|
| 0 | −V | 000 | 00 |
| 1 | −V/3 | 100 | 01 |
| 2 | +V/3 | 110 | 10 |
| 3 | +V | 111 | 11 |

To provide a more efficient representation of the detected symbol values of the inbound wave for 4-PAM signaling, an M-bit to P-bit, where M<P, thermometer encoder 350 may be used as coupled to the output of the VOCs. Such an encoder provides a P-bit value in response to an M-bit value, by encoding the larger M-bit values. For the example shown in the table above, binary coding is used to yield the last column of the table which shows that each symbol can be represented by a P=2 bit number. As an alternative to binary coding, gray coding may be used in which adjacent symbols are different only by changing one bit. It should be noted that although the example above is based on a 2 bit symbol, the entire methodology (including the calibration process described above) may easily be extended to a more general form of P bits per symbol.

Figure 5A:
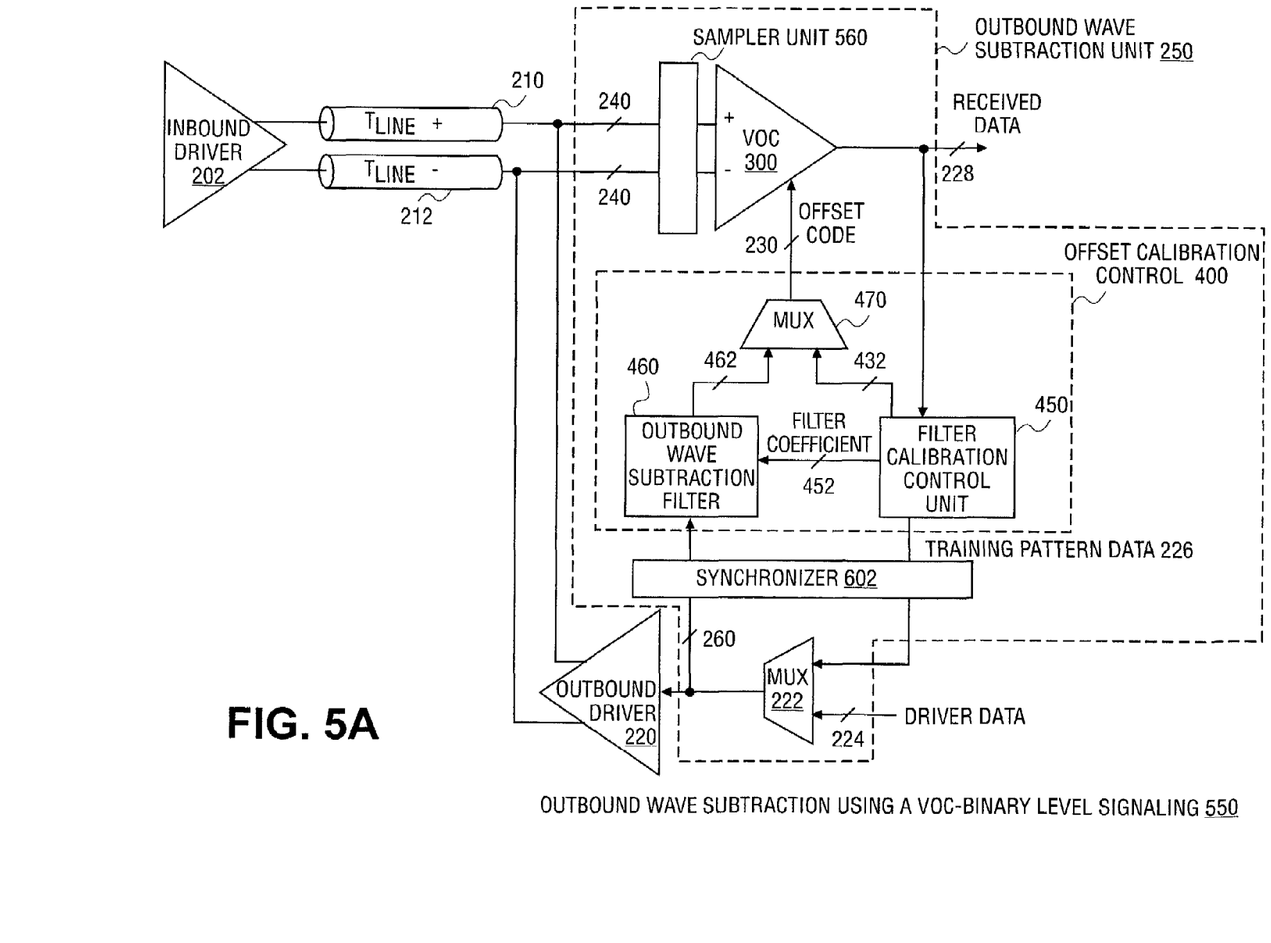
FIGS. 5A and 5B depict a simultaneous bi-directional signaling circuit utilizing binary level signaling in accordance with a further embodiment of the present invention.

Referring now to FIG. 5A, FIG. 5A depicts a simultaneous bi-directional signaling circuit 600 which supports binary level signaling. As such, the simultaneous bi-directional signaling circuit is more or less configured as described with reference to FIG. 2. However, the offset calibration control 400 is further illustrated. As described, the offset calibration control 400 includes filter calibration control 450 as well as an outbound wave subtraction filter. In the embodiment described, the offset calibration control utilizes a sampler unit 560 to determine one or more offset codes.

In the embodiment of FIG. 5A, the sampler unit 560 is coupled between the VOC input and the transmission line 210/212. This sampler unit 560 may be implemented using a sample and hold (i.e., s/h) circuit whose output is to provide the transmission line analog signal level. The sampler unit 560 may be used to reduce jitter in the received data. In such an embodiment, the sampler unit 560 is clocked by a receiver clock signal (not shown) that may be phase and frequency locked to a driver clock signal (not shown). In another embodiment, the sampler unit 560 is not used and the transmission line analog signal is fed directly to the input of the VOC 300. In such a case, the VOC 300 or its latched output may be timed by the receiver clock.

According to an embodiment, the driver data is transmitted as synchronized to the driver clock signal, while the received data is detected according to the timing provided by the receiver clock, where the receiver clock is time and frequency locked to the driver clock. The inbound driver 202, the outbound driver 220 and receiver (not shown) may be of the source synchronous variety in which a clock or strobe signal is transmitted in synch with the data, and the receiver clock is derived from the received clock or strobe. Other alternatives for timing the detection of the received data are possible.

According to another embodiment, the receiver further includes transmission line termination resistors (not shown) coupled to the transmission line 210/212 in front of the sampler unit 560. In yet another embodiment, electrostatic discharge protection circuitry (not shown) is coupled to the transmission line 210/212 in front of the sampler unit 560. Other types of circuitry well known to those of ordinary skill in the art may be included in the receiver.

In one embodiment, the filter calibration control, during a calibration mode, drives training pattern data 226 via the outbound driver 220 to the sampler unit 560. The sampler unit 560 samples a transmission line voltage of the bi-directional communications link 210. In one embodiment, an offset code for subtracting the outbound data from the dual inbound/outbound wave is performed by driving the inbound driver 202 to a high state and the outbound driver 220 to a low state. Then, for exactly one cycle, the state of the outbound driver 220 is driven from a low to a high and then back down to low. In between the cycle, the transmission line voltage 210/212 is sampled by the sampler unit block 560. Once the transmission is complete, the filter calibration control 450 samples the transmission line voltage at an output of the VOC 300. Once sampled, the VOC offset code is swept until a state change is detected at the VOC 300 output. Once the state change is detected, the value is saved as a coefficient value.

According to an embodiment, the filter 460 is implemented using a discrete time filter, such as a digital finite impulse response (i.e., FIR) filter. The discrete time filter provides a multi-bit binary value that changes in response to a sequence of logic values that form the received data. In this embodiment, the logic values are provided directly by the output of the comparator 300. The offset code value provided to the VOC 300 may be further modified by other mechanisms added to the receiver. In such cases, the filter output may be added to these other codes to form a resultant offset code value.

The response of a discrete time filter may be determined by its coefficients $a_0$, $a_1$, . . . These may be determined by a filter calibration control unit 450 during a calibration period. During the calibration period, the driver 104 is fed periodic training pulses (generated by a pulse generator within the filter calibration control unit 450), rather than valid driver data, through a multiplexer (i.e., mux) 222. The transmitted logic value sequence in a training pulse is known by the calibration control unit 450.

During the calibration period, the filter calibration unit 450 may need to directly control the offset of the VOC 300 (hence the presence of the mux 430). With the coefficients of the filter 460 being set so that the received data from the VOC output cancels the known, transmitted logic values, the offset calibration control 400 is ready for normal operation to cancel outbound data.

Figure 5B:
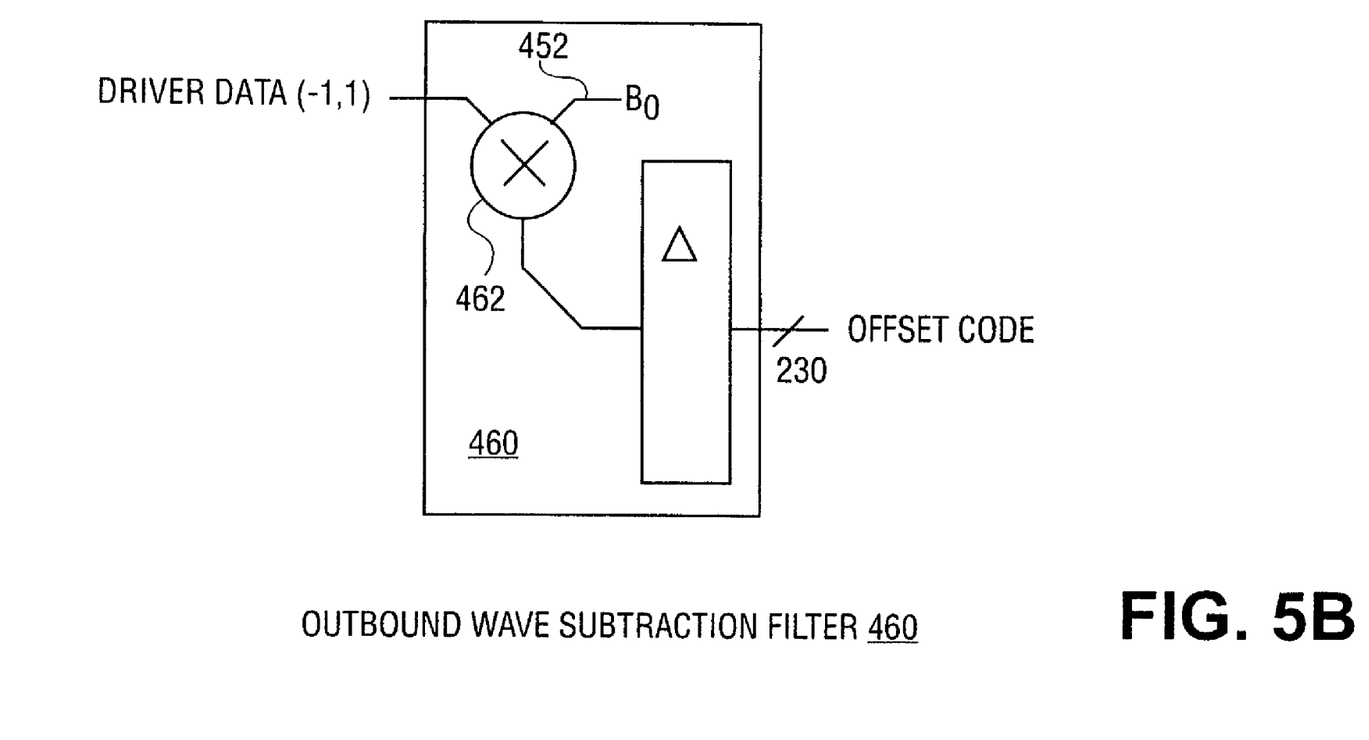

As such, for binary level signaling, a single value may be calculated as a filter coefficient which functions as the offset code. Accordingly, as depicted in FIG. 5B, the outbound wave subtraction filter 460 may include a multiplication circuit. As a result, based on the value of the driver data 224, the multiplication circuit will either multiply the filter coefficient 452 by negative or positive one in order to cancel a negative driver data or cancel a positive driver data. In certain embodiments, an outbound wave subtraction filter 460 may be utilized for multi-level signaling communications link if the signaling levels are equally spaced. Consequently, coefficient may simply be multiplied by the signaling level difference and either made negative or positive based on the value of the driver data 226.

Figure 6:
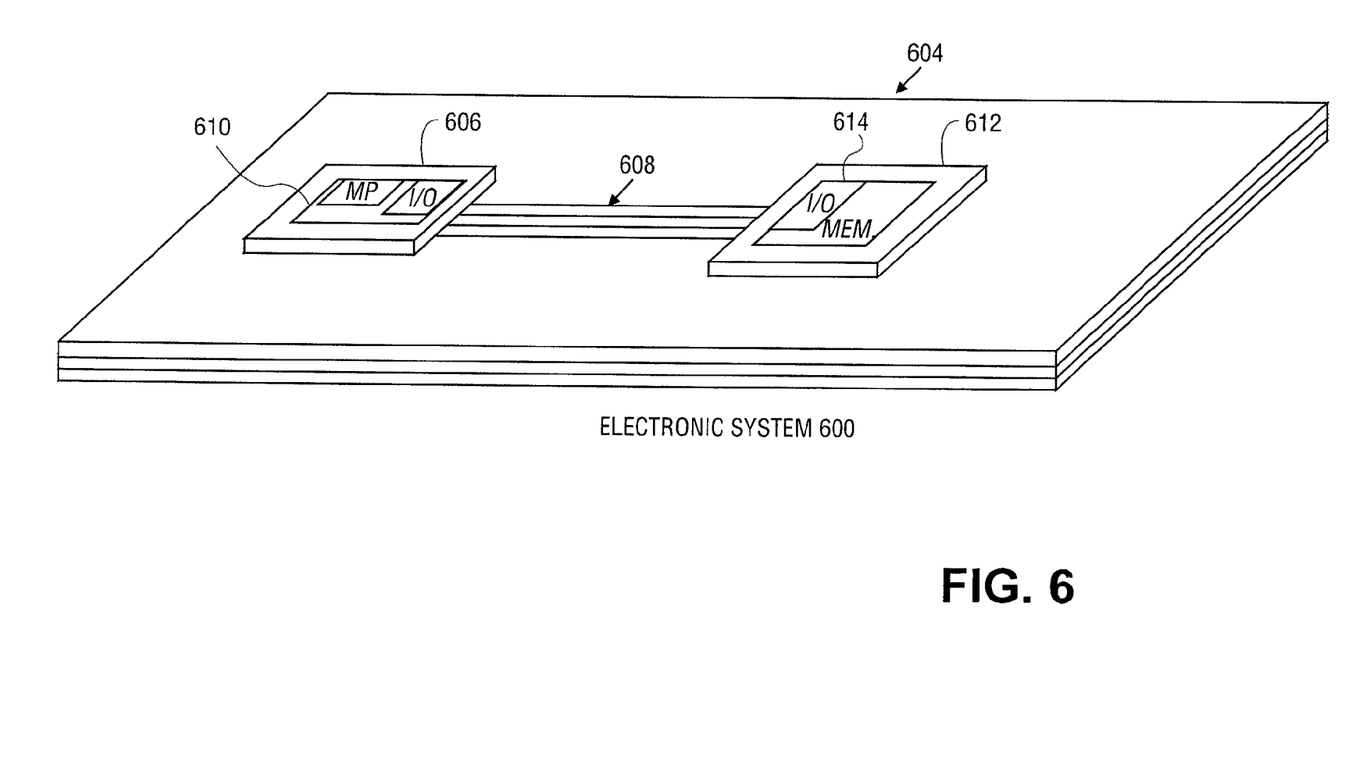
FIG. 6 depicts a block diagram illustrating an electronic system incorporating an outbound wave subtraction unit in accordance with an exemplary embodiment of the present invention.

Turning now to FIG. 6, what is shown is a block diagram of an embodiment of an electronic system 600 in which a communication link features the outbound wave subtraction unit as described above. The system includes a multi-layer printed wiring board 604 on which a parallel bus 608 is formed. The bus 608 may be of the point to point variety, or a multi-drop bus such as those used in a main memory. An integrated circuit (IC) chip package 606 is operatively installed on the board to communicate using the parallel bus 608. The installation of the package 606 may be done by a surface mount technique or via a connector or socket.

In addition, the package has an IC chip 610 that includes a logic function section, and an I/O section as an interface between the logic function section and the bus 608. The logic function suction may be one of the following well-known devices: a microprocessor, a memory controller, and a bus bridge. Alternatively, other devices that can be implemented in the logic function section of an IC chip may be used. The I/O section has a bus receiver in which an equalization loop as described above is provided.

A second IC package 612 is also installed on the board 604 to communicate with the first package 606 via the bus 608. The second IC package 612 also includes a chip 614 having an I/O section in which a bus receiver is provided to interface the bus 608, and its own logic function section (here shown as a memory controller).

According to an embodiment, the I/O interfaces of the two chips 610 and 614 communicate with each other bi-directionally, that is using the same conductive lines of the bus for both transmitting and receiving data. Thus, in such an embodiment, inbound and outbound drivers are provided, in both IC chips, that are connected to the same conductive lines of the bus 608. Other system applications of the outbound wave are possible, including, for example, a subtraction unit.

Accordingly, the simultaneous bi-directional signaling circuits depicted in FIGS. 2, 4, 5A and 6 do not suffer from the problem described above with reference to conventional simultaneous bi-directional signaling circuits. By using a VOC 300, the bi-directional signaling circuits avoids the use of analog components such as subtractors and replica drivers which fail to achieve higher bandwidth within input/output (IO) links, as required by future products. In addition, such conventional techniques are often incompatible with advanced communication techniques such as channel filtering and multi-level signaling. Procedural methods for implementing the teachings of the present invention are now described.

Operation

Figure 7:
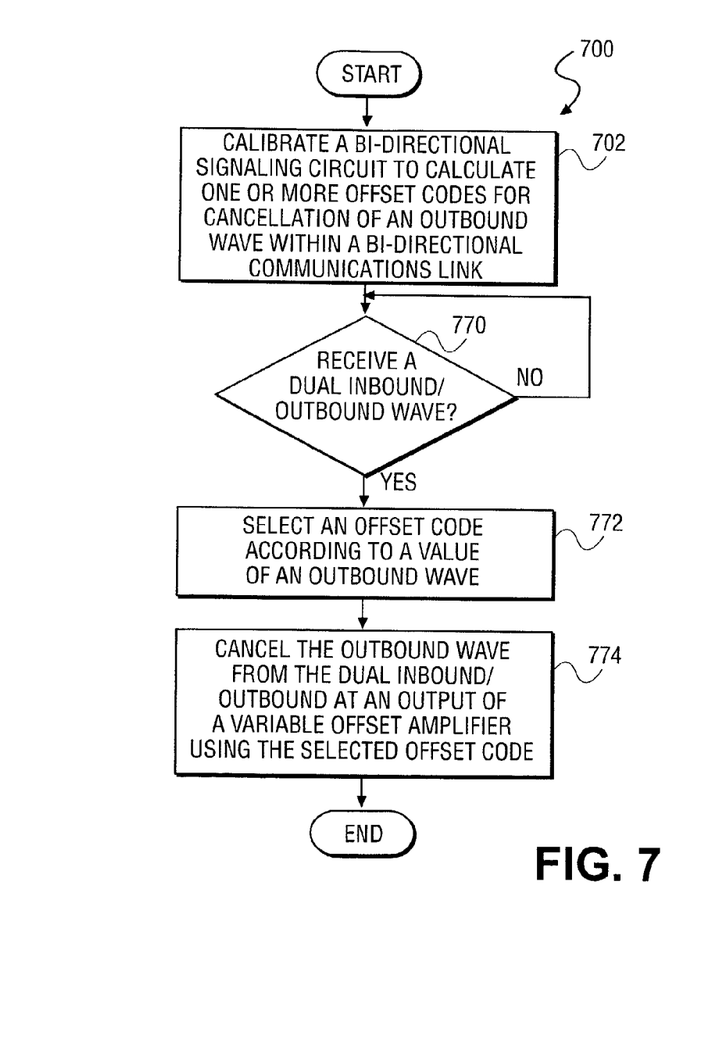
FIG. 7 depicts a flowchart illustrating a method for outbound wave subtraction using a variable offset amplifier within a simultaneous bi-directional signaling circuit in accordance with a further embodiment of the present invention.

Referring now to FIG. 7, FIG. 7 illustrates depicts a flow chart illustrating a method 700 for subtracting an outbound wave from a dual inbound/outbound wave 240 received by a simultaneous bi-directional signaling circuit, for example, as depicted in FIGS. 2, 4, 5A and 5B. At process block 702, calibration of a simultaneous bi-directional signaling circuit is performed by the outbound wave subtraction unit 250 to calculate one or more offset codes 220 for cancellation of an outbound wave within a bi-directional communications link 210/212. Once the one or more offset codes 230 are calculated, at process block 770, it is determined whether a dual inbound/outbound wave is received by the bi-directional signaling circuit.

Once a dual inbound/outbound wave 240 is received, process block 772 is performed. At process block 772, an offset code 230 is selected according to a value 250 of an outbound wave 224 which forms the dual inbound/outbound wave 240. This process block is possible due to the fact that the simultaneous bi-directional signaling circuit is aware of the driver data 224 which will form the outbound wave portion of the dual inbound/outbound wave. Finally, at process block 774, the outbound wave is cancelled from the dual inbound/outbound wave 240 at an output of a variable offset amplifier 300 using the selected offset code 230.

Figure 8:
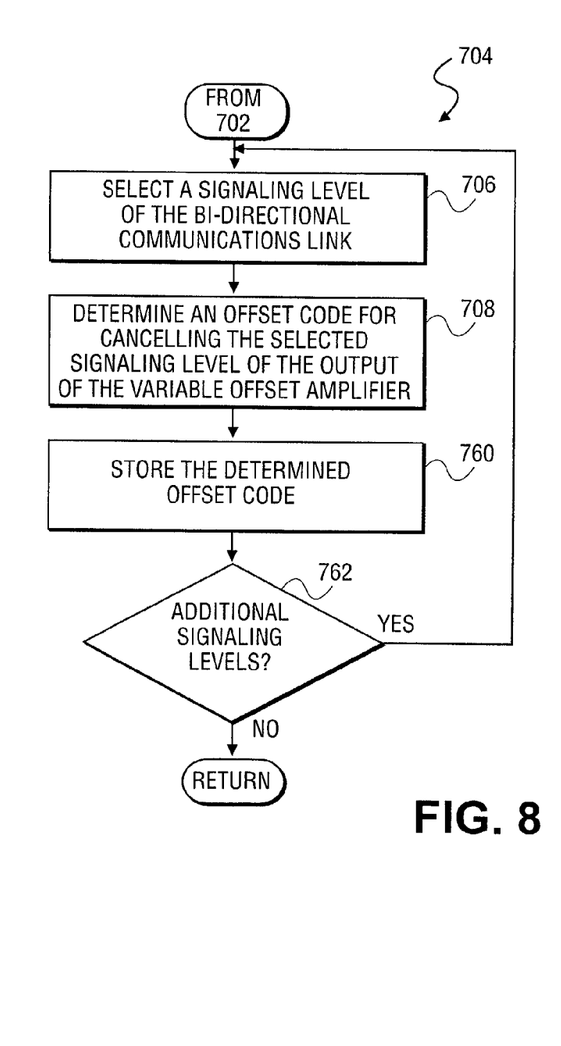
FIG. 8 depicts a flowchart illustrating an additional method for calculating offset codes in order to cancel an outbound wave within a bi-directional communications link in accordance with a further embodiment of the present invention.

Referring now to FIG. 8, FIG. 8 depicts a flow chart illustrating an additional method 704 for calibrating the bi-directional signaling circuit to calculate the one or more offset codes of process block 702 as depicted in FIG. 7. At process block 706, a signaling level of the bi-directional communications link 210 is selected. Once selected at process block 708, an offset code is determined for canceling the selected signaling level at the output of the variable offset amplifier 300. Next, at process block 760, the offset code determined at process block 708 is stored. Finally, at process block 762, process blocks 706 through 760 are repeated for each signaling level of the bi-directional communications link 210/212.

Figure 9:
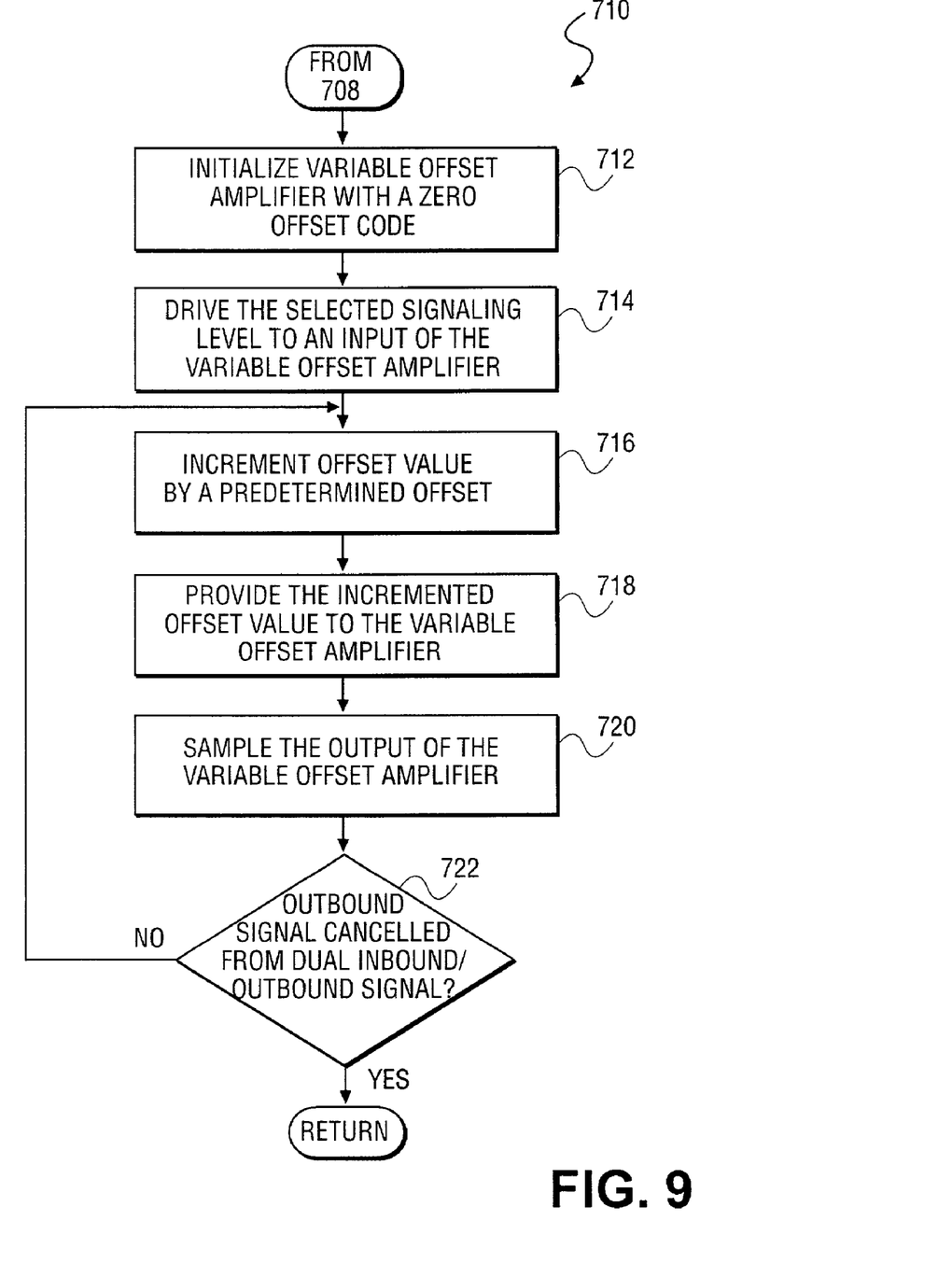
FIG. 9 depicts a flowchart illustrating an additional method for determining an offset code for canceling a selected signaling level at an output of a variable offset amplifier in accordance with a further embodiment of the present invention.

Referring now to FIG. 9, FIG. 9 depicts a flow chart illustrating an additional method 710 for determining the offset code of process block 708 as depicted in FIG. 8. At process block 710, the variable offset amplifier 300 is initialized with a zero offset code. As described above, this may be performed by trimming the offset code to a least significant bit value. At process block 714, a selected signaling level is driven to an input of the variable offset amplifier 300. Next, at process block 716, the offset value is incremented by a predetermined amount, based on, for example, a transmission line voltage level at an input of the variable offset amplifier 300. At process block 718, the incremented offset value is provided to the variable offset amplifier 300. Once provided, at process block 720 the output of the variable offset amplifier 300 is sampled. Finally, at process block 722, process blocks 716 through 720 are repeated until the outbound signal is cancelled from the dual inbound/outbound signal 240.

Figure 10:
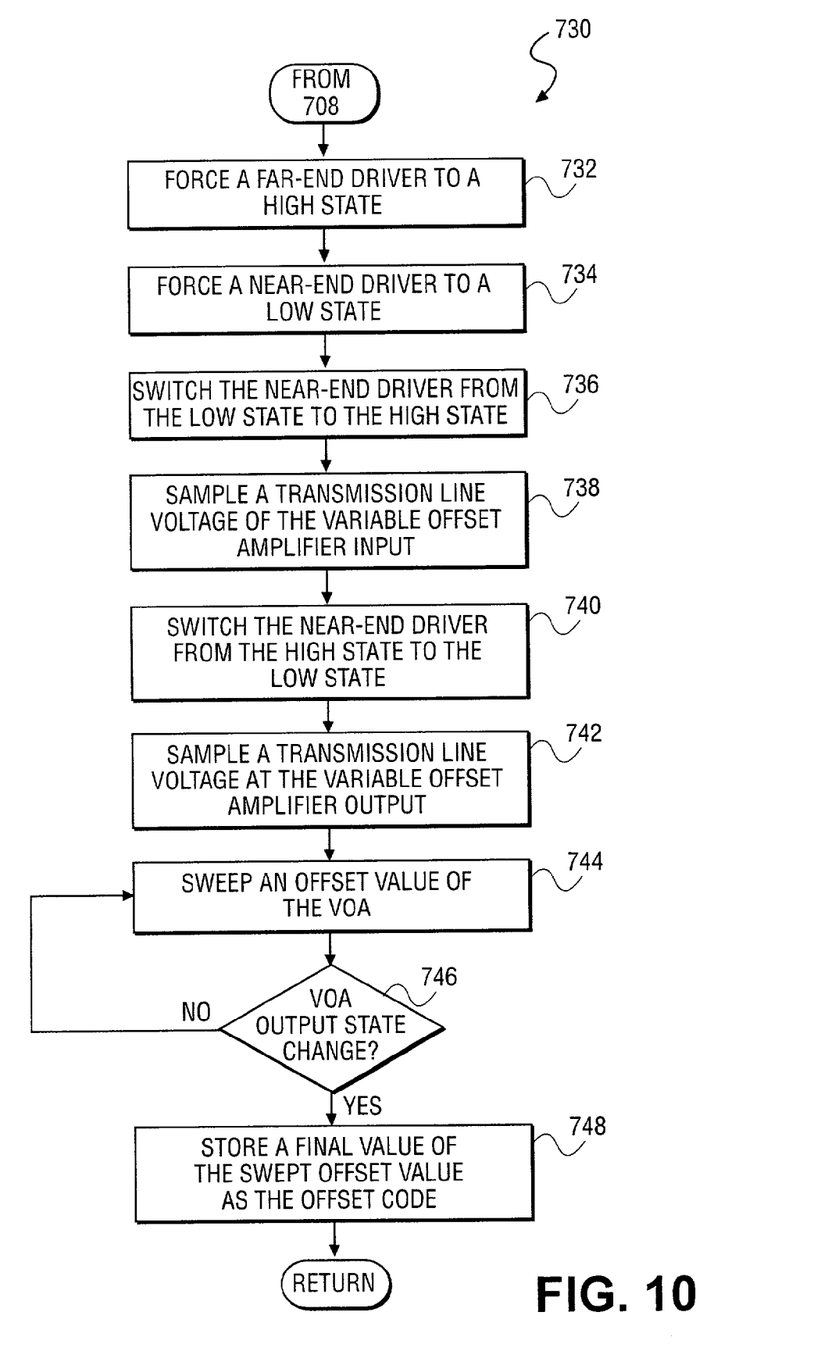
FIG. 10 depicts a flowchart illustrating an additional method for calculating an offset code within a simultaneous bi-directional circuit utilizing binary level signaling in accordance with an exemplary embodiment of the present invention.

Referring now to FIG. 10, FIG. 10 depicts a flow chart illustrating an additional method 730 for determining the offset code of process block 708 as depicted in FIG. 7 within a bi-directional signaling circuit 600 which supports binary level signaling as depicted in FIG. 5A. At process block 732, the inbound driver 202 is forced to drive a high state. Next, at process block 702 an outbound driver 220 is forced to drive a low state. At process block 736, the outbound driver 220 is switched from the low state to a high state Once switched, process block 738 is performed. At process block 738, a transmission line voltage is sampled at an input of the variable offset amplifier 300 by sampler unit 560.

Once the transmission line voltage is sampled, process block 740 is performed. At process block 740, the outbound driver 220 is switched from the high state back to the low state. Once switched, at process block 742 the transmission line voltage is sampled at an output of the variable offset amplifier 300. Once sampled, at process block 744, an offset value of the VOC 300 is swept. At process block 746, process block 744 is repeated until an output of the VOC 300 indicates a state change. Once a state change is detected, process block 748 is performed. At process block 748, a final value of the swept offset code or offset value is stored as the coefficient offset value as described with reference to FIG. 5B.

Figure 11:
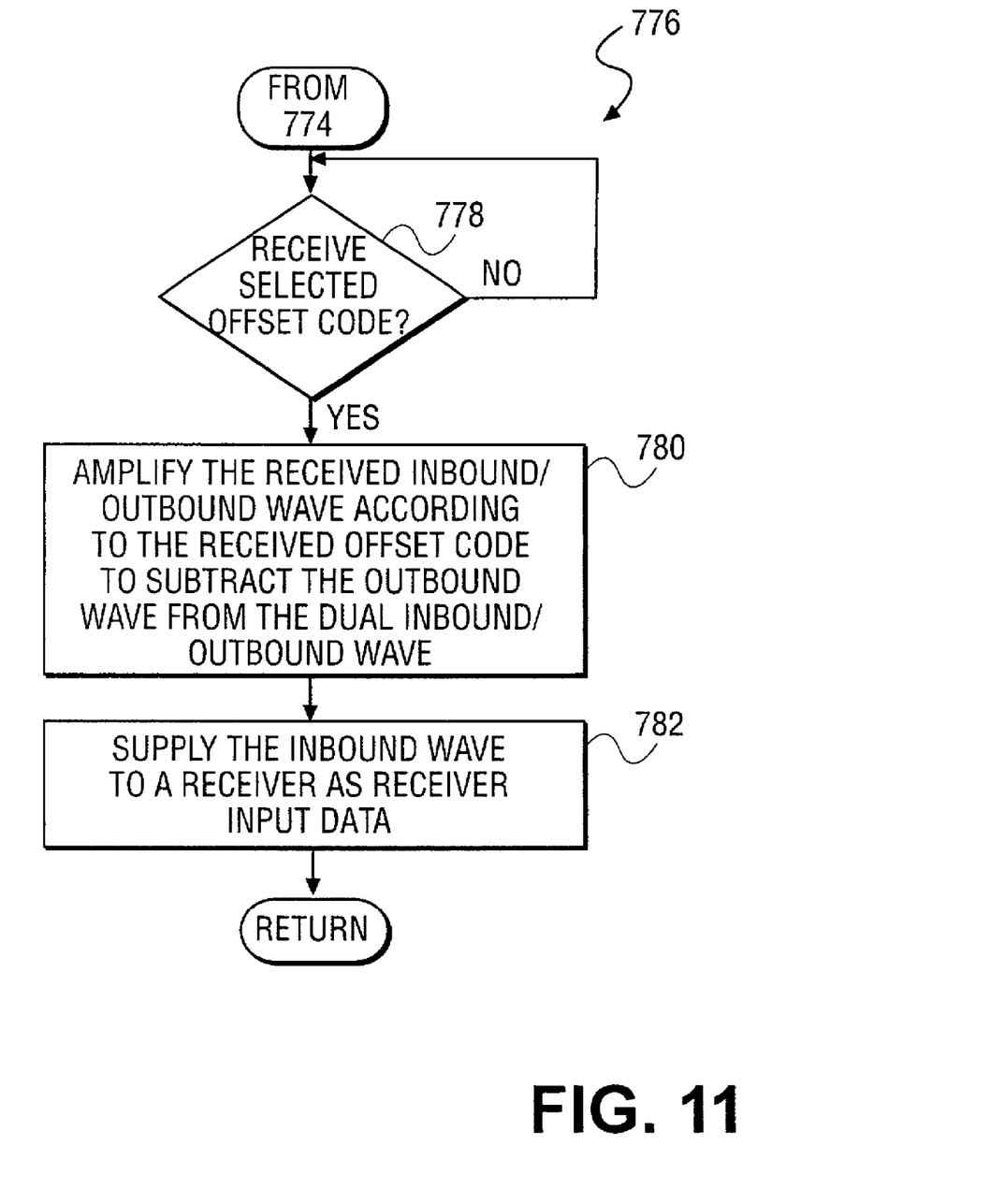
FIG. 11 depicts a flowchart illustrating a method for canceling an outbound wave in response to receipt of a selected offset code in accordance with an exemplary embodiment of the present invention.

Finally, referring to FIG. 11, FIG. 11 depicts a flow chart illustrating an additional method 776 for canceling the outbound wave from a received dual inbound/outbound wave 240. At process block 778, it is determined whether a selected offset code 220 is received. Once received, process block 780 is performed. At process block 780, the received inbound/outbound wave 240 is amplified according to the received offset code 230 to subtract the outbound wave from the dual inbound/outbound wave 240. Finally, at process block 782, the inbound wave is supplied to a receiver as receiver input data.

Alternate Embodiment

Several aspects of one implementation of the simultaneous bi-directional signaling circuit for providing subtraction of an outbound wave from a received dual inbound/outbound wave have been described. However, various implementations of the circuit provide numerous features including, complementing, supplementing, and/or replacing the features described above. Features can be implemented as part of a circuit or as part of a variable offset amplifier in different implementations. In addition, the foregoing description, for purposes of explanation, used specific nomenclature to provide a thorough understanding of the invention. However, it will be apparent to one skilled in the art that the specific details are not required in order to practice the invention.

In addition, although an embodiment described herein is directed to a bi-directional signaling circuit, it will be appreciated by those skilled in the art that the teaching of the present invention can be applied to other systems. In fact, systems for full duplex or bi-directional communication link for removing inbound or outbound waves are within the teachings of the present invention, without departing from the scope and spirit of the present invention. The embodiments described above were chosen and described in order to best explain the principles of the invention and its practical applications. These embodiment were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the present invention to the full extent indicated by the broad general meaning of the terms in which the appended claims are expressed.

The present invention provides many advantages over known techniques. The present invention includes the ability to cancel an outbound wave from a received dual inbound/outbound wave within bi-directional or full duplex communications links. The outbound wave subtraction method described herein enables higher bandwidths within input/output (IO) links of future products. In addition, this form of outbound wave cancellation enables fast and accurate bi-directional techniques with very little overhead. This technique is also compatible with advanced communication techniques such as channel filtering and multi-level signaling. As such, the present invention avoids the need for replicate drivers and subtraction circuits while providing an implementation which requires low power and limited area. Accordingly, only a simple filter or multiplexer is needed without the need for any multipliers.

Having disclosed exemplary embodiments, modifications and variations may be made to the disclosed embodiments while remaining within the scope of the invention as defined by the following claims.

What is claimed is:

1. A method comprising:
    calculating an offset code for cancellation of each amplitude signaling level of a multi-level signaling bi-directional communications link prior to receipt of a dual inbound/outbound wave within the bi-directional communications link; and
    canceling, using an offset code from the calculated offset codes, an outbound wave from a received dual inbound/outbound wave at an output of an amplifier;
    where the multi-level signaling comprises three or more signaling levels.

2. The method of claim 1, wherein calculating offset codes further comprises:
    selecting a signaling level of the bi-directional communications link;
    determining an offset code for canceling the selected signaling level at an output of a variable offset amplifier;
    storing the determined offset code; and
    repeating the selecting, determining and storing for each signaling level of the bi-directional communications link to form the offset codes.

3. The method of claim 2, wherein determining the offset code further comprises:
    initializing the variable offset amplifier with a zero offset code;
    driving the selected signaling level to an input of the variable offset amplifier;
    incrementing an offset value by a predetermined amount;
    providing the incremented offset value to the variable offset amplifier;
    sampling the output of the variable offset amplifier; and
    repeating the driving, incrementing, providing and sampling until the selected signaling level is cancelled from the sampled output, such that a final value of the incremented offset value forms the determined offset code.

4. The method of claim 2, wherein determining the offset code further comprises:
    forcing a far-end driven to a high state;
    forcing a near-end driver to a low state;
    switching the near-end driver from the low state to a high state;
    sampling a transmission line voltage at an input of the variable offset amplifier;
    switching the near-end driver from the high state to a low state;
    sampling a transmission line voltage at an output of the variable offset amplifier; and
    sweeping an offset code of the variable offset amplifier until a state change of the output of the variable offset amplifier is detected.

5. The method of claim 1, wherein canceling the outbound wave further comprises:
   when a dual inbound/outbound wave is received at an input of a variable offset amplifier, selecting a stored offset code according to a value of an outbound wave; and
   providing the selected offset code to the variable offset amplifier to cancel the outbound wave from the dual inbound/outbound wave.

6. The method of claim 1, wherein providing the selected offset value further comprises:
   receiving the selected offset code;
   amplifying the received inbound/outbound wave according to the received offset code, such that the outbound wave is subtracted from the dual inbound/outbound wave; and
   supplying the inbound wave to a receiver as receiver input data.

7. A computer readable storage medium including program instructions that direct a computer to function in a specified manner when executed by a processor, the program instructions comprising:
   calculating an offset code for cancellation of each amplitude signaling level of a multi-level signaling bi-directional communications link prior to receipt of a dual inbound/outbound wave within the bi-directional communications link; and
   canceling, using an offset value from the calculated offset codes, an outbound wave from a received dual inbound/outbound wave at an output of an amplifier;
   where the multi-level signaling comprises three or more signaling levels.

8. The computer readable storage medium of claim 7, wherein calculating offset codes further comprises:
   selecting a signaling level of the bi-directional communications link;
   determining an offset code for canceling the selected signaling level at an output of a variable offset amplifier;
   storing the determined offset code; and
   repeating the selecting, determining and storing for each signaling level of the bi-directional communications link to form the offset codes.

9. The computer readable storage medium of claim 8, wherein determining the offset code further comprises:
   initializing the variable offset amplifier with a zero offset code;
   driving the selected signaling level to an input of the variable offset amplifier;
   incrementing an offset value by a predetermined amount;
   providing the incremented offset value to the variable offset amplifier;
   sampling the output of the variable offset amplifier; and
   repeating the driving, incrementing, providing and sampling until the selected signaling level is cancelled from the sampled output, such that a final value of the incremented offset value forms the determined offset code.

10. The computer readable storage medium of claim 8, wherein determining the offset code further comprises:
    forcing a far-end driven to a high state;
    forcing a near-end driver to a low state;
    switching the near-end driver from the low state to a high state;
    sampling a transmission line voltage at an input of the variable offset amplifier;
    switching the near-end driver from the high state to a low state;
    sampling a transmission line voltage at an output of the variable offset amplifier; and
    sweeping an offset code of the variable offset amplifier until a state change of the output of the variable offset amplifier is detected.

11. The computer readable storage medium of claim 7, wherein canceling the outbound wave further comprises:
    when a dual inbound/outbound wave is received at an input of a variable offset amplifier, selecting a stored offset code according to a value of an outbound wave; and
    providing the selected offset code to the variable offset amplifier to cancel the outbound wave from the dual inbound/outbound wave.

12. The computer readable storage medium of claim 7, wherein providing the selected offset value further comprises:
    receiving the selected offset code;
    amplifying the received inbound/outbound wave according to the received offset code, such that the outbound wave is subtracted from the dual inbound/outbound wave; and
    supplying the inbound wave to a receiver as receiver input data.

13. An apparatus, comprising:
    a variable offset amplifier having an input coupled to a bi-directional communications link and an output coupled to a receiver input;
    an inbound driver coupled to the variable offset amplifier input via the bi-directional communications link;
    an outbound driver coupled to the variable offset amplifier input via the bi-directional communications link; and
    an offset calibration control coupled between the variable offset amplifier output and an outbound driver input, the offset calibration control to calculate an offset code for cancellation of each signaling level of a multi-level signaling bi-directional communications link prior to receipt of a dual inbound/outbound wave to cancel an outbound wave from a received dual inbound/outbound wave at the output of the variable offset amplifier.

14. The apparatus of claim 13, further comprising:
    an offset code selection unit to determine a value of an outbound wave and select an offset code, according to the outbound wave value, from one or more stored offset codes and provide the selected offset code to the variable offset amplifier.

15. The apparatus of claim 14, wherein the variable offset amplifier receives the selected offset code, amplifies the received inbound/outbound wave according to the received offset code, such that the outbound wave is subtracted from the dual inbound/outbound wave and supplies the inbound wave to a receiver as receiver input data.

16. An electronic system comprising:
    a printed circuit board on which a parallel bus is formed, an integrated circuit (IC) chip package being operatively installed on the board to communicate using the parallel bus, the package having an IC chip tat includes a logic function section and an I/O section as an interface between the logic function section and the bus, the I/O section having a bus receiver in which an outbound wave subtraction wilt includes an offset calibration control to calculate an offset code for cancellation of each signaling level of the parallel bus prior to receipt of a dual inbound/outbound wave, and a variable offset amplifier, the variable offset amplifier has an input to receive a dual inbound/outbound signal, the variable offset amplifier to cancel an outbound signal from the dual inbound/outbound signal at an output of the variable offset amplifier using an offset code received from the offset calibration control according to a signal level of the dual inbound/outbound signal.

17. The electronic system of claim 16 wherein the logic function section is a microprocessor.

18. The electronic system of claim 16 wherein the logic function section is a memory controller.

19. The electronic system of claim 16 wherein the logic function section is a bus bridge.

* * * * *